J. J. WOOD.
LIQUID MIXER.
APPLICATION FILED JAN. 9, 1913.

1,089,806.

Patented Mar. 10, 1914.

Witnesses
Marcus L. Byng.
Anthony Mart.

Inventor
James J. Wood
by Albert G. Davis
His Attorney,

UNITED STATES PATENT OFFICE.

JAMES J. WOOD, OF FORT WAYNE, INDIANA, ASSIGNOR TO GENERAL ELECTRIC COMPANY, A CORPORATION OF NEW YORK.

LIQUID-MIXER.

1,089,806.  Specification of Letters Patent.  Patented Mar. 10, 1914.

Application filed January 9, 1913. Serial No. 741,001.

*To all whom it may concern:*

Be it known that I, JAMES J. WOOD, a citizen of the United States, residing at Fort Wayne, county of Allen, State of Indiana, have invented certain new and useful Improvements in Liquid-Mixers, of which the following is a specification.

My invention relates to liquid mixers, that is, apparatus adapted to violently agitate the contents of a liquid containing receptacle, and more particularly to the beater or agitator for such apparatus.

My invention has for its object a simple and improved agitating device which is capable of thoroughly mixing one liquid with another. To this end, I construct my agitator as a disk provided with one or more inclined holes therethrough, which are preferably inclined so that they tend to pump the contents of the liquid containing receptacle downward.

For a better understanding of my invention reference may be had to the following description taken in connection with the accompanying drawing, in which—

Figure 1:
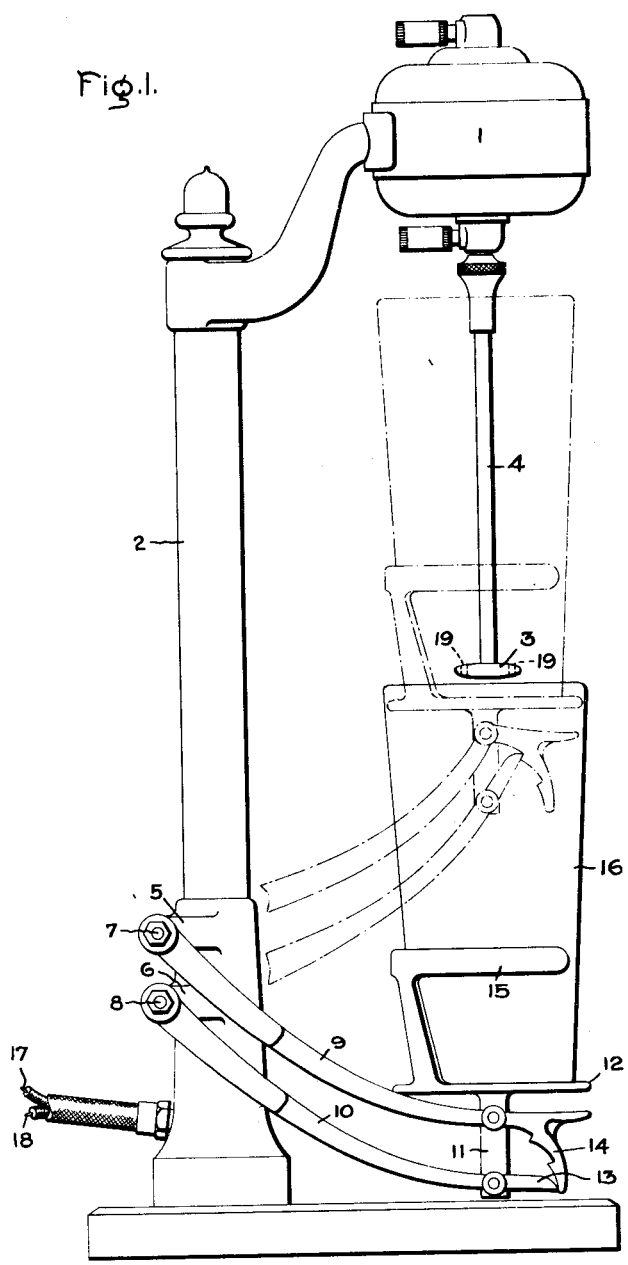
Figure 2:
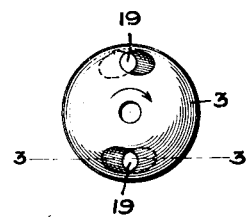

Figure 1 is a view of a liquid mixer in connection with which an agitator embodying my invention may be used; Fig. 2 is a plan view of my agitator, and Fig. 3 is a sectional view of the agitator of Fig. 2 taken on the line 3—3.

In Fig. 1, I have illustrated my agitator in connection with the liquid mixer of my prior Patent No. 1,057,024, dated March 25, 1913. This mixer comprises an electric motor 1 which is mounted on a standard 2 and drives the agitator 3 through a shaft 4. The standard 2 is provided with lugs 5 and 6 which form bearings for shafts 7 and 8. Arms 9 and 10, each having bifurcated ends, are secured at one end to the shafts 7 and 8 respectively, and the other bifurcated ends of these arms are pivoted to a vertical rod 11 depending from a flat support 12. The arm 10 has a projection 13 extending beyond the rod 11 and adapted to act as a pawl in coöperation with a pivoted ratchet member 14. A guard 15 is fastened to the support 12, and together these members are adapted to coöperate in holding a liquid containing receptacle 16. Current supply wires 17 and 18 for the motor 1 enter the standard near its bottom.

When the parts are in the position shown in full lines, the motor 1 is at rest and the receptacle 16 is in its lowest position, from which it can be removed without spilling its contents. When it is desired to agitate the contents of the receptacle, the parts are moved into the dotted position, which completes the circuit of the motor as fully described in my prior patent, and the agitator 3 is set in rapid motion thereby thoroughly mixing the contents of the receptacle.

Figure 3:

The agitator 3 is shown in detail in Figs. 2 and 3 and consists of a disk having one or more inclined holes 19 therethrough, the openings of the holes in the bottom of the disk trailing in the direction of rotation behind the openings of the holes in the top of the disk. The disk preferably has flat top and bottom surfaces to which the holes are inclined at an angle of substantially 45 degrees. If the holes are inclined as described above and shown in the drawing and the agitator rotated in the direction of the arrow, the liquid in the receptacle 16 will be set in whirling motion and pumped downward or depressed. If one of the liquids to be mixed is viscous, as for instance eggs, it is very difficult to break it up into small particles and mix it with the other liquids in the receptacle. The sharp edges of the holes 19 in my agitator, however, break up such a viscous liquid in a very short time, and the violence with which the liquids in the receptacle are pumped down thoroughly mixes them, without spattering. In the particular construction of agitator shown, two holes 19 are provided near the edge of the disk and except for these holes the agitator is smooth. I have found by experiment, that if my agitator is revolved at the speed usually employed in liquid mixers of the type shown in Fig. 1 and in a direction reverse to that of the arrow in Fig. 2 which will pump the liquids upward, the agitation is so violent that the liquid will be thrown out of the receptacle.

Although I have illustrated my agitator in connection with the liquid mixer of my prior Patent, No. 1,057,024, I desire it to be understood that it may be used with any type of liquid mixer in which the agitator is revolved.

What I claim as new and desire to secure by Letters Patent of the United States, is:—

1. The combination with a receptacle, of a shaft extending downward into said receptacle, means for rotating said shaft, and an agitator secured to said shaft, said agitator comprising a disk provided with an inclined hole therethrough near the edge of said disk, the opening of the hole in the bottom of the disk trailing in the direction of rotation behind the opening of the hole in the top of the disk.

2. The combination with a receptacle, of a shaft extending downward into said receptacle, means for rotating said shaft, and an agitator secured to said shaft, said agitator comprising a disk having substantially flat top and bottom surfaces and being provided with a plurality of inclined holes therethrough near the edge of said disk, the openings of the holes in the bottom of the disk trailing in the direction of rotation behind the openings of the holes in the top of the disk.

3. The combination with a receptacle, of a shaft extending downward into said receptacle, means for rotating said shaft, and an agitator secured to said shaft, said agitator comprising a disk having substantially flat top and bottom surfaces and being provided with a plurality of holes therethrough near the edge of said disk, said holes being inclined at an angle to said surfaces, the openings of the holes in the bottom of the disk trailing in the direction of rotation behind the openings of the holes in the top of the disk whereby the liquid in said container is set in whirling motion and pumped downward.

4. The combination with a receptacle of a shaft extending downward into said receptacle, means for rotating said shaft, and an agitator secured to said shaft, said agitator comprising a disk having substantially flat top and bottom surfaces and being provided with a plurality of holes therethrough near the edge of said disk, said holes being inclined substantially 45 degrees to said surfaces, the openings of the holes in the bottom of the disk trailing in the direction of rotation behind the openings of the holes in the top of the disk whereby the liquid in said container is set in whirling motion and pumped downward.

In witness whereof, I have hereunto set my hand this 6th day of January, 1913.

JAMES J. WOOD.

Witnesses:
 A. L. HADLEY.
 WALTER KENT.

---

Copies of this patent may be obtained for five cents each, by addressing the "Commissioner of Patents, Washington, D. C."